Figure 1:
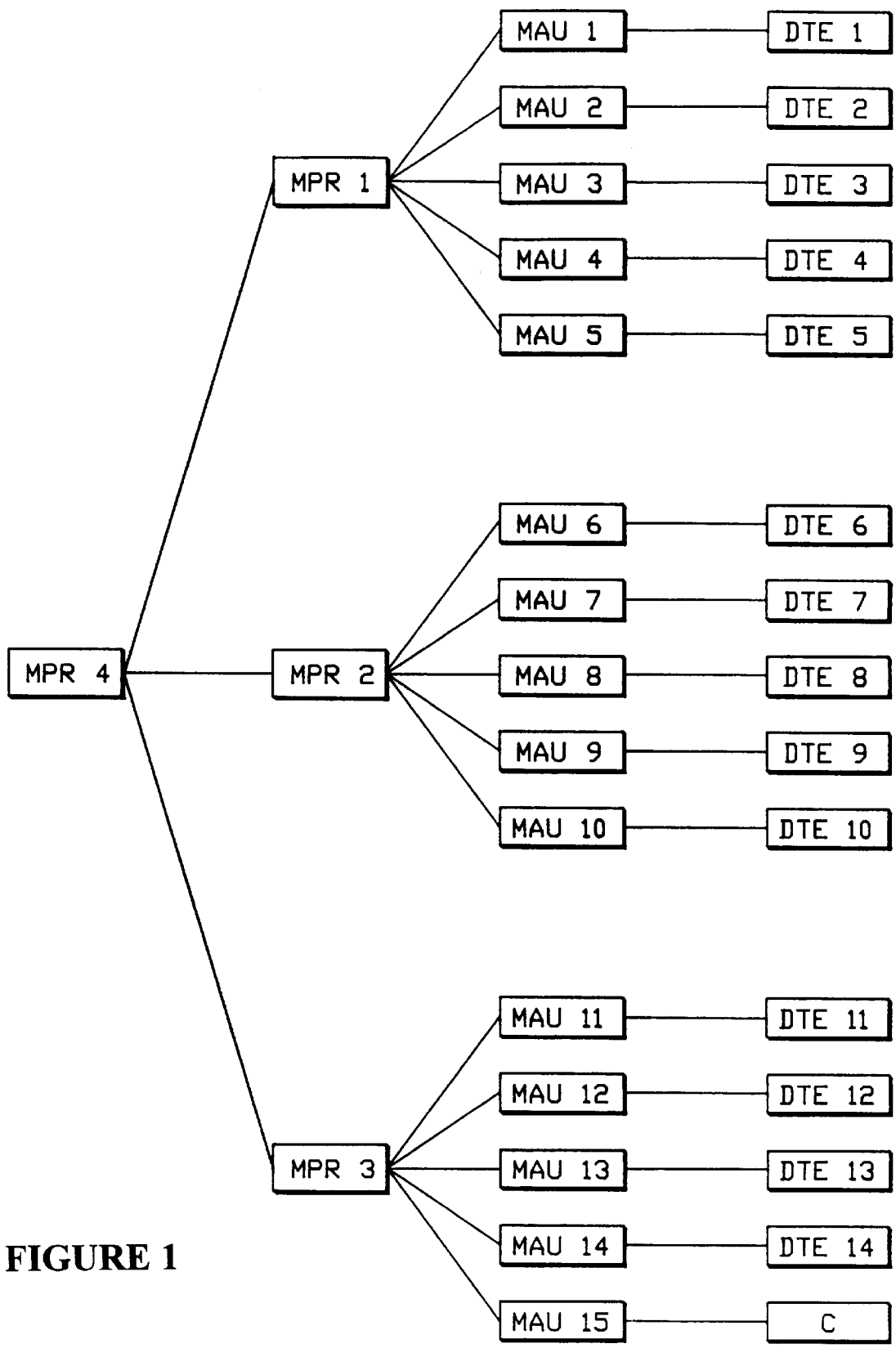

United States Patent

Carter et al.

[11] Patent Number: 5,822,303
[45] Date of Patent: *Oct. 13, 1998

[54] REPEATERS FOR SECURE LOCAL AREA NETWORKS

[75] Inventors: Steven Howard Carter, Prestwood; Terence Denning Lockyer, Luton; Christopher John Gahan, Kings Langley, all of Great Britain

[73] Assignee: 3Com Ireland, Cayman Islands

[*] Notice: The term of this patent shall not extend beyond the expiration date of Pat. No. 5,161,192.

[21] Appl. No.: 380,749

[22] Filed: Jan. 30, 1995

Related U.S. Application Data

[63] Continuation of Ser. No. 111,012, Aug. 24, 1993, Pat. No. 5,386,470, which is a continuation of Ser. No. 913,475, Jul. 15, 1992, abandoned, which is a continuation of Ser. No. 609,791, Nov. 7, 1990, Pat. No. 5,161,192.

[30] Foreign Application Priority Data

Dec. 6, 1989 [GB] United Kingdom ............... 8927623

[51] Int. Cl.$^6$ ................... H04K 1/00; H04L 9/32
[52] U.S. Cl. ............. 370/246; 370/392; 340/825.34; 380/25; 380/49
[58] Field of Search ............... 370/13, 13.1, 85.2, 370/85.3, 94.3, 241, 246, 389, 392; 380/9, 23, 25, 48, 49, 50; 340/825.3, 825.31, 825.32, 825.34, 825.5, 825.54; 395/187.01

[56] References Cited

U.S. PATENT DOCUMENTS

| | | |
|---|---|---|
| 4,449,247 | 5/1984 | Waschka, Jr. . |
| 4,626,845 | 12/1986 | Ley . |
| 4,627,052 | 12/1986 | Hoare et al. . |
| 4,672,572 | 6/1987 | Alsberg . |
| 4,692,918 | 9/1987 | Elliott et al. . |
| 4,783,657 | 11/1988 | Bouchard et al. . |
| 4,887,075 | 12/1989 | Hirasawa . |
| 4,896,319 | 1/1990 | Lidinsky et al. . |
| 4,901,348 | 2/1990 | Nichols et al. . |
| 4,974,190 | 11/1990 | Curtis . |
| 5,161,192 | 11/1992 | Carter et al. . |
| 5,177,788 | 1/1993 | Schanning et al. . |
| 5,311,593 | 5/1994 | Carmi ........................... 380/23 |
| 5,453,980 | 9/1995 | Van Engelshoven ............ 370/85.5 |
| 5,455,828 | 10/1995 | Zisapel ............................ 370/85.3 |
| 5,489,896 | 2/1996 | Sofer et al. ................. 340/825.05 |

OTHER PUBLICATIONS

European Search Report EP 90 31 2060.
Kwok, et al., On Transparent Bridging of CSMA/CD Networks, 1989 IEEE, pp. 5.7.1 through 5.7.6 (Dallas Globecom '89 IEEE Global Telecommunications Conference & Exhibition, vol. 1 of 3, Nov. 27–30, 1989).
Weinstein, "Bridging to a Better LAN", 8187 Mini–Micro Systems, XXII (1989) Feb., No. 2, Newton, MA, pp. 86–88.
Japanese Abstract 59–63839(A), vol. 8, No. 167 (E–258) Aug. 2, 1984.
Brian P. Schanning, Secure Relays: An Alternative Approach to LANSEC, Apr. 3, 1989, pp. 31–52.
"Physical Signaling, Medium Attachment, and Baseband Medium Specification, Type 1Base5, StarLAN" Specification excerpts of Draft C Unapproved Draft, Oct. 1985, IEEE Computer Society.

*Primary Examiner*—Melvin Marcelo
*Attorney, Agent, or Firm*—Wilson Sonsini Goodrich & Rosati

[57] ABSTRACT

A multiport repeater for a local area network installation has (in addition to its conventional functions) storing access rules for the items of equipment connected to it. It reads a portion of each frame, which may be all or part of the destination address segment and/or of the source address segment and/or of the control segment of each incoming data frame, or it could be a frame or protocol identifier incorporated in opening bytes of the data segment. It compares the data that it reads with the stored access rules to determine whether the frame is permitted or not. If not, it corrupts the frame which it is in the course of re-transmitting, for example by overwriting it with meaningless digits. It may also report the source address, destination address and reason for deciding to corrupt the frame to the network controller.

19 Claims, 3 Drawing Sheets

REPEATERS FOR SECURE LOCAL AREA NETWORKS

This application is a continuation of application Ser. No. 08/111,012, filed Aug. 24, 1993 (U.S. Pat. No. 5,386,470); which is a continuation of application Ser. No. 07/913,475, filed Jul. 15, 1992 (now abandoned); which is a continuation of application Ser. No. 07/609,791, filed Nov. 7, 1990, now U.S. Pat. No. 5,161,192.

This invention relates to local area networks for providing intercommunication between computers and/or other digital equipment (hereinafter called data termination equipment and abbreviated to DTE). More particularly, it is concerned with networks of the kind in which DTE's are connected (normally via a media attachment Unit (MAU), also called a transceiver) to a common transmission medium such as a coaxial cable, a twisted pair cable or an optical fibre and in which digital repeaters (usually multiport repeaters, MPR's) are used to restore digital signals that have been attenuated or otherwise degraded and to provide for branching when required. The invention includes improved repeaters and the networks in which they are used.

The invention is primarily (but not exclusively) concerned with networks operating Carrier Sense Multiple Access techniques with collision detection (CSMA/CD). The best-known networks of this type are those specified by the International Standards Organisation as ISO 8802/3 networks and by Xerox Corporation as "Ethernet" networks.

In such systems, data is transmitted in frames which have a limited range of lengths and are normally made up of a meaningless preamble (for establishing synchronisation), a start-of-frame indicator, a destination address segment, a source address segment, a control segment (indicating, for instance, the frame length), a segment of data (often beginning with a frame or protocol identification) to be transmitted to the DTE identified by the address identification, and a frame check segment for verifying accuracy of transmission.

MPR's repeat frames received on an input port indiscriminately to all their output ports and necessarily (because of delay limits imposed by the network specifications) begin to retransmit before the complete frame has been received.

A local area network as so far described is insecure, in the sense that any DTE can transmit data to any other and that an eavesdropper gaining access to the transmission medium can read all the data.

In known systems, a measure of security may be achieved by physically subdividing the transmission medium into groups using components called "bridges" which receive and store computer data frames and can then analyse them and determine whether they are authorised frames and if so to which of its output ports they need to be re-transmitted. However, bridges are much more expensive than MPR's and introduce a delay in excess of the frame length.

The present invention provides repeaters with security features such that in a local area network in which they are used the expense and signal delay inherent in the use of bridges can be avoided, or at least minimised.

In accordance with the invention, a repeater is characterised by having (in addition to whatever known repeater functions are desired) means for storing access rules for the DTE's connected to it; means for reading at least one portion of the frame selected from the destination address segment, the source address segment, the control segment and the frame or protocol identifier (if present) of each incoming data frame and comparing the portion or portions so read with the stored access rules to determine whether the frame is permitted or not; and means for corrupting the frame in retransmission if it determines that it is not.

When the portion of the frame selected to be read is in the control segment, it may be the whole segment or it may be only a part of the segment that is relevant to the decision to be made. In most (but not necessarily all) other cases, the whole of the appropriate address segment or of the identifier should be read.

The access rules may be written to their storing means in various ways, depending (among other things) on the level of security required. For example, a degree of security can be achieved by allowing a learning period when the network is first set up in which the repeater "self-learns" which DTE's are connected to each of its ports and thus sets up its own access rules for each port forbidding the transmission thereafter of any frame with a source address not corresponding with a DTE not connected to that port during the learning period.

More sophisticated rules can be loaded (or self-learned rules can be editied) using data provided as control frames from a network manager, or if the possibility of the network manager being misused or counterfeited needs to be allowed for, from a special input device (a key pad or a mobile memory device, for instance) coupled to the repeater itself and protected from misuse either by password protection or by removing the input device once the access rules have been written. In extreme cases, the means provided in the repeater for coupling the input device could be destroyed after use, or the rules could be inserted as a pre-programmed ROM encapsulated along with key components of the repeater to prevent substitution.

Either one or both of the destination address segment and the source identification segment may be read and compared with the stored access rules, depending on the nature of the rules to be applied. For example, if the physical connections are such that all the DTE's connected to a particular input port (or group of ports) of a repeater have unlimited access to the network, then there is no point in comparing the destination address segments of frames received on that port, and it is only necessary to check the source address segment to verify that the DTE in question is authorised to be connected there. Similarly, if physical security can be relied on to prevent unauthorised connections and all the DTE's connected to a port (of group of ports) have the same (but limited) access to other parts of the network, then only the destination address segment needs to be read and compared.

Subject to the limitations set by comparison time and storage space, each DTE may have its own access rules, independently of all the others, or if the DTE's are organised in groups with common access rules, then it is possible for individual DTE's to be allocated to more than one of the groups; for example, a departmental accountant's terminal could have access to all the other terminals within his department and also to other accountants' terminals outside the department, without the need to give unnecessary access between the remaining terminals of those two groups.

Ideally, all the data contained in an unauthorised frame should be corrupted, and this presents no problems if the destination address segment shows the frame to be unauthorised; if however it is the source address, the control frame or the frame or protocol identifier segment that shows the frame to be unauthorised, the time taken to make comparisons may be such that a few bytes of data may be retransmitted without corruption. If this is considered unacceptable, high-speed comparison algorithms may be used and/or the system protocol may be modified so that there will be an appropriate number of meaningless bytes at the beginning of the data segment.

Data may be corrupted, when required, by overwriting a series of binary digits selected from all 1's, all 0's, cyclically repeated sequences and pseudo-random sequences. The first two require no more complex generating means than a simple logic gate, say a non-exclusive OR gate, receiving the incoming data on one input and a permitted/not permitted flipflop signal on its other input so as to pass the data to output if the flipflop is set "permitted" but a continuous "high" or "low" output if it is set "not permitted".

Cyclically repeated or pseudo-random sequences can be read from memory or generated when required by conventional means.

Data may alternatively be corrupted by encrypting it in a manner that cannot be decrypted by the DTE's of the network, except possibly one or a few authorised DTE's (for instance the network controller). This provides the facility for the controller, or a security unit, to be informed of the content of the corrupted frame.

If desired, a repeater which detects an unauthorised frame may, in addition to corrupting it, switch off the port on which such a frame was received and/or the port to which the DTE it was addressed to is connected. Preferably it only does so if it knows that the port concerned is not connected to another repeater.

On occasion, an unauthorised person gaining access to a network may not be concerned to transmit unauthorised data, nor to read data from the network, but to prevent proper functioning of the network. One easy way of so "jamming" a conventional network is to inject into it a rapid succession of frames that conform to the system protocol, so that any other user seeking to transmit will encounter a "collision". As a precaution against this form of abuse, the repeater in accordance with the invention may additionally be fitted with a timer (or frame counter) device arranged to limit the number of consecutive frames that will be accepted on any one port and to switch off that port if the limit is exceeded.

If desired, the repeater in accordance with the invention may be switchable (e.g. by a local, key-operated switch or by a control frame from a network manager) between secure operation in accordance with the invention and ordinary, insecure, operation; the latter may be desirable, for example, during fault testing and identification.

Figure 2A:
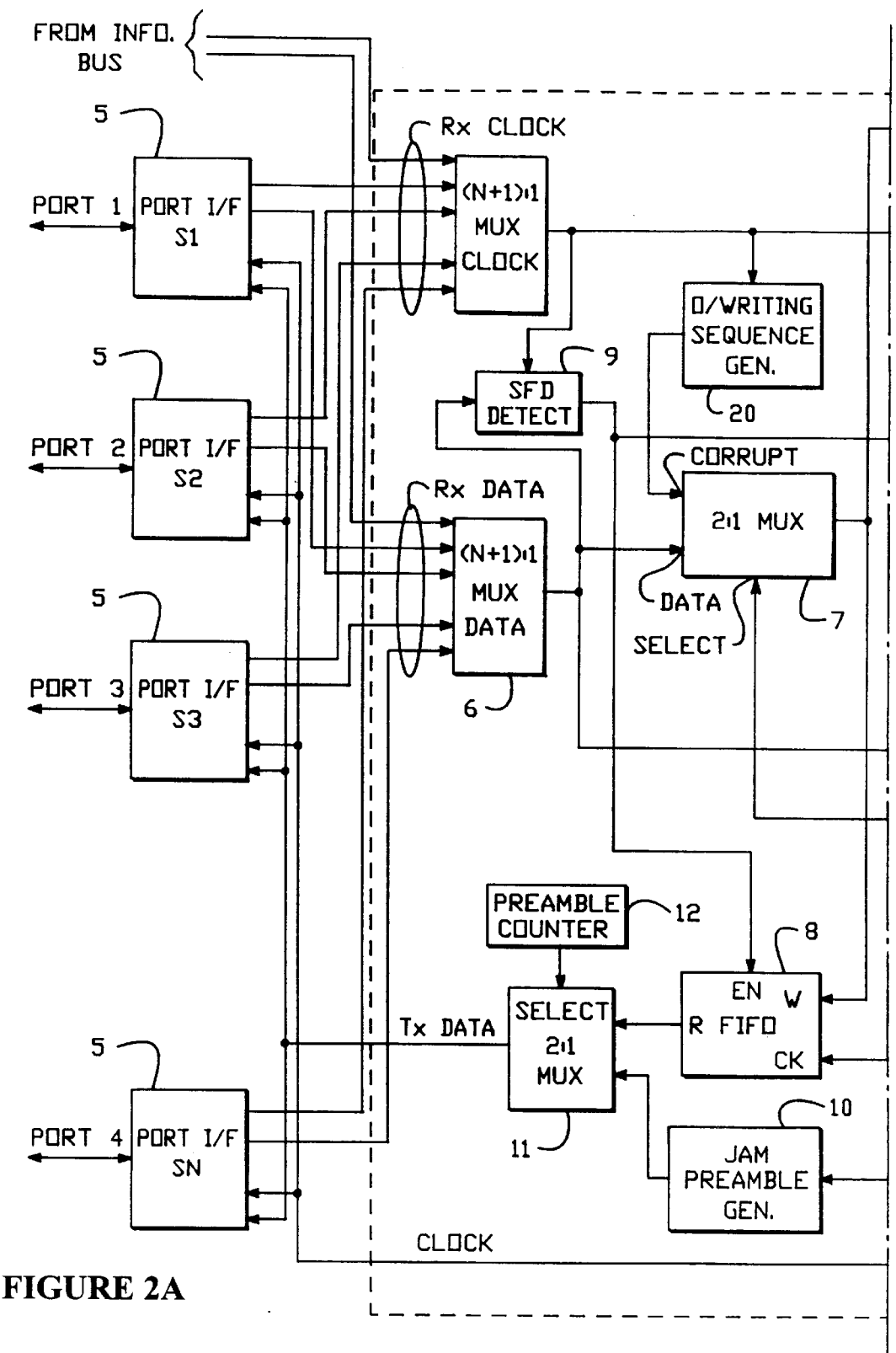
Figure 2B:
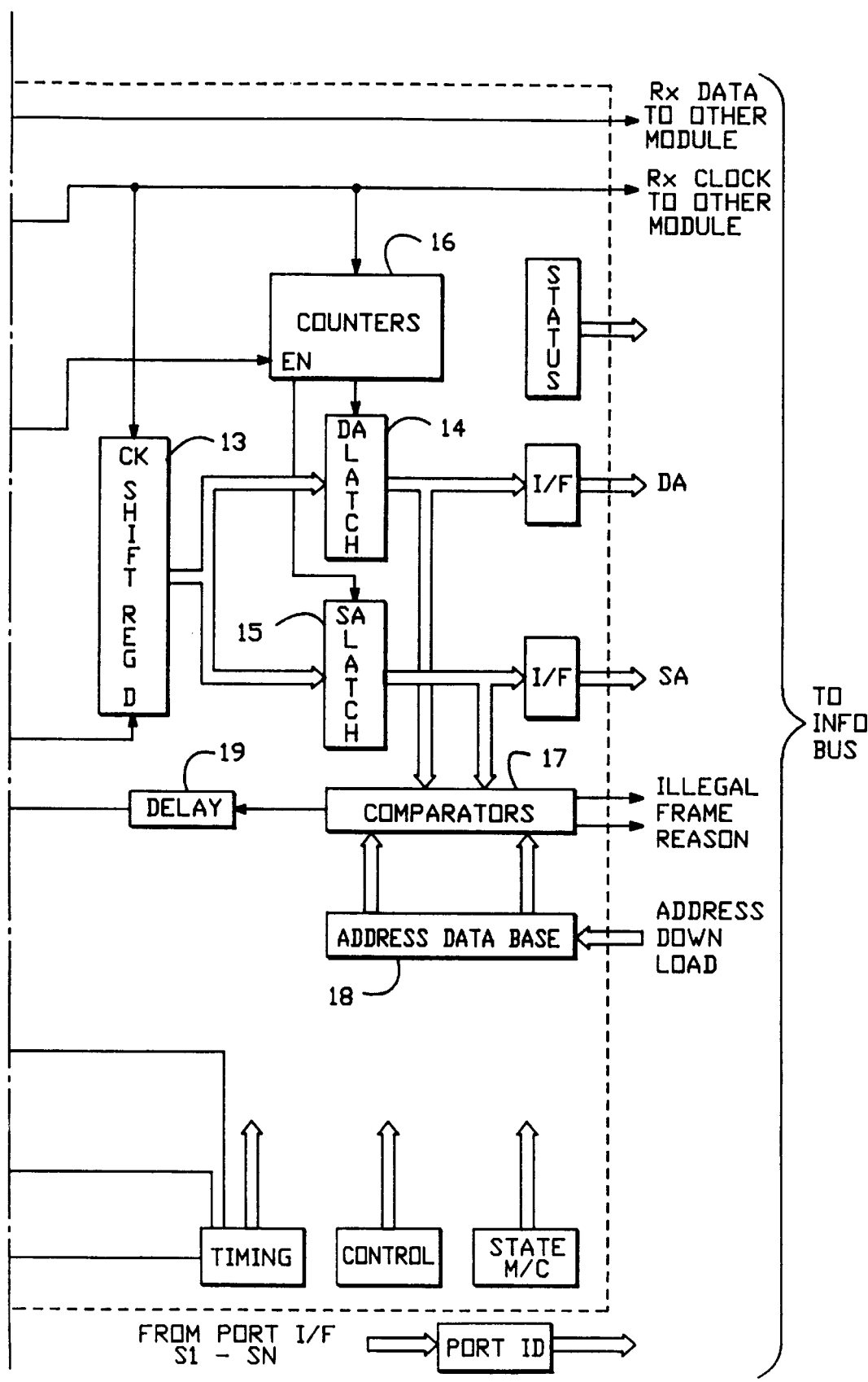

The invention will be further described by way of example with reference to the accompanying drawings in which FIG. 1 is a diagram of a network in accordance with the invention incorporating four multiport repeaters and FIG. 2 is a block diagram of those parts of a multiport repeater that are relevant to understanding of the present invention.

The network of FIG. 1 comprises 14 items of data termination equipment, DTE 1 to DTE 14 (which may for example be general purpose personal computers, dedicated word processors, printers, disc drives etc), and a network controller C. Each of these is connected through its own media access unit MAU 1 to MAU 15 to one or other of three multiport repeaters MPR 1, MPR 2 and MPR 3; these are in turn interconnected by the remaining repeater MPR 4.

FIG. 2 shows one module serving ports 1 to 4 of an MPR, the assumption for the purpose of illustration being that there is at least one other module serving further ports, and that the access rules will be the same for all the ports connected to this module.

The most basic conventional function of the MPR is served by the inputs received on any one of ports 1 to 4 passing via respective port interface units 5 and multiplexors 6 and 7 to a first in/first out memory 8. This is inert until enabled by a signal from a start of frame detector 9, and then begins to store the incoming data. In the meantime, a preamble generator 10 has begun to output a preamble signal through the multiplexor 11 to all of the port interfaces, which will pass it to their respective ports except in the case of the port receiving the incoming signal. Preamble transmission continues until a counter 12 indicates that the prescribed length of preamble has been outputted. Provided there are then at least 3 bits of data in the memory 8, the multiplexor 11 is switched to begin reading out the data stored in the memory, and in the ordinary way will continue to do so until the complete frame has been received into and then read from the memory 8.

However, in accordance with the invention, the incoming signal is also passed via a shift register 13 which extracts the destination address and the source address in parallel form to latches 14 and 15 which are switched by counters 16 enabled by the start of frame signal from detecter 9. These are passed to comparators 17 and compared with the access rules previously stored in a database 18.

If the comparators indicate that the frame is not in accordance with the rules contained in the database, then a signal is output via a delay 19 (serving to ensure that the source address will never be corrupted) to the multiplexor 7, and cause it to transmit, for the remainder of the length of the frame, a meaningless sequence of digits available to it from a sequence generator 20 instead of the incoming signal. Preferably when such a signal is given, data is also transmitted to the network controller C identifying the port on which the frame concerned was received, the destination address and source address of the frame and the reason for the decision that the frame was unauthorised. If desired, this signal may be separated from the system data signals into a separate signalling medium, designated on the diagram as an info bus.

The repeater provides in addition conventional facilities for detecting a collision and transmitting jam signals in response to it, for extending signal fragments arising from collisions and for disabling a port on which excessive collisions or frame lengths exceeding the protocol limit are indicative of faulty equipment.

Suppose, by way of example, that DTE's 1 to 5 need to communicate with each other but with none of the other DTES. DTE's 6 to 9 similarly need access only to each other but DTE 10 needs access not only to DTE 6 to 9 but also DTEs 11 to 14; obviously, all the DTE's need to be in communication with the network controller C. This could be achieved by connecting MAUs 1 to 5 to one module (or to separate modules with the same instructions in their address rule databases) in MPR 1, MAU 6 to 9 to one module and MAU 10 to a separate module in MPR 2 and similarly MAUs 11 to 14 to one module and MAU 15 to a second module in MPR 3. In MPR 1, the address database needs to be loaded with rules accepting destination addresses corresponding to the network controller C and to its own DTE's 1 to 5 but no other, and may optionally be loaded with the source addresses of its own DTE's 1–5 in order to reject signals from an additional DTE connected to it without authority. The first module of MPR 2 is correspondingly loaded. The second module of MPR 2, on the other hand, is loaded with rules accepting destination addresses corresponding to MAU's 6 to 9 and 11 to 14 as well as to the network controllers MAU 15 (and if required to accept no source address except that of DTE 10).

The first module of MPR 3 is loaded with rules accepting destination addresses corresponding to any of MAU's 10–15

(and optionally to accept only source addresses corresponding to MAU's 11 to 14); and the second module of MPR 3 is loaded to accept any destination address (and preferably to accept no source address except that of the network controller C).

MPR 4 may, if physical security is reliable, be a conventional MPR without security features; or it may be a repeater in accordance with the invention loaded with analagous rules to provide additional security.

Note that in this example, the network has been so arranged that each destination address and each source address is either accepted or rejected unconditionally. This has the advantage of requiring the shortest processing time, and consequently allowing an unauthorised frame to be corrupted from as nearly as possible the beginning of its data segment. It is however possible, subject to process time limitations, to provide conditional rules allowing certain destination addresses to be accessed from some but not all of the DTE's connected to the module in question.

What we claim as our invention is:

1. A method for providing security within a network, the network communicating data frames having identifiable destinations on communication media using a carrier sense, multiple access media access protocol with collision detection among devices within the network, said method comprising:

receiving frames at a first device within the network from a device within the network, the first device having repeater functions; and performing the repeater functions on the received frames including processing the received frames in the first device, based on the identifiable destination in the received frames, such that a received frame having an authorized destination within the network is forwarded substantially unchanged on a port in the first device which is connected to a device corresponding to the authorized destination, and a modified version of the received frame is forwarded on a port in the first device which is connected to a device within the network but not corresponding to the authorized destination whilst maintaining collision detection within the network.

2. The method of claim 1, including:

automatically learning during a learning interval, authorized destinations within the network for ports in the first device, and using the learned authorized destinations in the step of processing.

3. The method of claim 1, including corrupting the received frame to produce the modified version of the received frame.

4. The method of claim 1, including encrypting the received frame to produce the modified version of the received frame.

5. A method for providing security within a network, said network communicating data frames having identifiable sources on communication media using a carrier sense, multiple access media access protocol with collision detection among devices within the network, said method comprising:

receiving frames at a first device within the network from a device within the network, said first device having repeater functions; and performing the repeater functions on the received frames including processing the received frames in the first device based on the identifiable source in the received frames, such that a received frame having an authorized source within the network is forwarded substantially unchanged on a port in the first device connected to another device within the network, and a modified version of a received frame having an unauthorized source is forwarded on a port in the first device connected to another device within the network.

6. The method of claim 5, including:

automatically learning during a learning interval, authorized sources within the network, and using the learned authorized sources in the step of processing.

7. The method of claim 5, including corrupting the received frame to produce the modified version of the received frame.

8. The method of claim 5, including encrypting the received frame to produce the modified version of the received frame.

9. A method for providing security within a a network, said network communicating data frames having identifiable destinations and identifiable sources on communication media using a carrier sense, multiple access media access protocol with collision detection among devices within the network, said method comprising:

receiving frames at a first device within the network from a device within the network, said first device having repeater functions;

performing the repeater functions including processing the received frames in the first device, based on the identifiable destination in the received frames, such that a received frame having an authorized destination within the network is forwarded substantially unchanged on a port in the first device which is connected to a device corresponding to the authorized destination, and a modified version of the received frame is forwarded on a port in the first device which is connected to a device within the network but not corresponding to the authorized destination; and processing the received frames in the first device, based on the identifiable source in the received frames, by which a port in the first device on which a frame having an unauthorized source is received is disabled.

10. The method of claim 9, including:

automatically learning during a learning interval, authorized destinations within the network for ports in the first device, and using the learned authorized destinations in the step of processing based on the identifiable destination.

11. The method of claim 9, including:

automatically learning during a learning interval, authorized sources within the network, and using the learned authorized sources in the step of processing based on the identifiable source.

12. The method of claim 9, including corrupting the received frame to produce the modified version of the received frame.

13. The method of claim 9, including encrypting the received frame to produce the modified version of the received frame.

14. The method of claim 9, including:

further processing the received frames in the first device, based on the identifiable source in the received frames, such that a received frame having an authorized source within the network is forwarded substantially unchanged on a port in the first device connected to another device within the network, and a modified version of a received frame having an unauthorized source is forwarded on a port in the first device connected to another device within the network.

15. A method for providing security within a network, said network communicating data frames having identifiable destinations on communication media using a carrier sense, multiple access protocol with collision detection among devices within the network, said network comprising a set of devices such that every said device is capable of detecting collisions with data frames transmitted by any device of the set, said method comprising:

receiving frames at a first device within the network from a device within the network;

forwarding a received frame substantially unchanged on one port in the first device which is connected to a device within the network and that corresponds to the identifiable destination in the received frame; and forwarding a modified version of the received frame on at least one port in the first device which is connected to a device within the network and that does not correspond to the identifiable destination in the received frame.

16. A method for providing security within a network, the network communicating data frames having identifiable destinations on communication media using a carrier sense, multiple access media access protocol with collision detection among devices within the network, said method comprising:

receiving frames at a first device within the network from a device within the network, the first device having repeater functions; and performing the repeater functions on the received frames including processing the received frames in the first device, based on the identifiable destination in the received frames, such that a received frame having an authorized destination within the network is forwarded substantially unchanged on a port in the first device which is coupled to a device corresponding to the authorized destination, and a modified version of the received frame is forwarded on a port in the first device which is coupled to a device within the network but not corresponding to the authorized destination whilst maintaining collision detection within the network.

17. The method of claim 16, including:

automatically learning during a learning interval, authorized destinations within the network for ports in the first device, and using the learned authorized destinations in the step of processing.

18. A method for providing security within a network, said network communicating data frames having identifiable sources on communication media using a carrier sense, multiple access media access protocol with collision detection among devices within the network, said method comprising:

receiving frames at a first device within the network from a device within the network, said first device having repeater functions; and performing the repeater functions on the received frames including processing the received frames in the first device based on the identifiable source in the received frames, such that a received frame having an authorized source within the network is forwarded substantially unchanged on a port in the first device coupled to another device within the network, and a modified version of a received frame having an unauthorized source is forwarded on a port in the first device coupled to another device within the network.

19. The method of claim 18, including:

automatically learning during a learning interval, authorized sources within the network, and using the learned authorized sources in the step of processing.

* * * * *